United States Patent [19]

Graffunder et al.

[11] 4,168,724
[45] Sep. 25, 1979

[54] VALVE ARRANGEMENT FOR DISTRIBUTING FLUIDS

[75] Inventors: Horst Graffunder; Brigitte Wittmann; Heinz Kohls, all of Berlin, Fed. Rep. of Germany

[73] Assignee: Max-Planck-Gesellschaft zur Forderung der Wissenschaften, e.V., Fed. Rep. of Germany

[21] Appl. No.: 845,087

[22] Filed: Oct. 25, 1977

[30] Foreign Application Priority Data

Oct. 27, 1976 [DE] Fed. Rep. of Germany ....... 2648751

[51] Int. Cl.² .............................................. F16K 11/22
[52] U.S. Cl. ................... 137/606; 137/238; 137/884; 251/61.1
[58] Field of Search .............. 137/238, 596.14, 596.15, 137/596.16, 606, 863, 884, 885; 251/61.1

[56] References Cited

U.S. PATENT DOCUMENTS

| | | | |
|---|---|---|---|
| 2,376,918 | 5/1945 | Hughes | 137/596.14 X |
| 2,865,402 | 12/1958 | Miller | 137/238 X |
| 3,156,157 | 11/1964 | Smith et al. | 137/863 X |
| 3,698,432 | 10/1972 | Kutz | 137/884 |
| 3,747,637 | 7/1973 | Mollere | 251/61.1 X |
| 3,787,026 | 1/1974 | Lazar | 251/61.1 |
| 3,856,046 | 12/1974 | Brown et al. | 251/61.1 X |
| 3,934,611 | 1/1976 | Gachot et al. | 137/884 |

FOREIGN PATENT DOCUMENTS

458681 2/1975 U.S.S.R. ................. 251/61.1

*Primary Examiner*—Gerald A. Michalsky
*Attorney, Agent, or Firm*—Blum, Moscovitz, Friedman & Kaplan

[57] ABSTRACT

An improved valve arrangement for distributing liquid and/or gaseous substances from a plurality of substance storing vessels to a processing vessel utilizing fluidic pressure control valves. A common conduit line runs through a block and has an output end connectable to a receiving vessel, the line has a series of openings along one surface of the block. Flexible membranes disposed above the openings of the common conduit line and similar openings in the block surface connected to the supply conduit lines control the fluid communication between the supply conduits and the common conduit.

7 Claims, 3 Drawing Figures

VALVE ARRANGEMENT FOR DISTRIBUTING FLUIDS

BACKGROUND OF THE INVENTION

This invention is directed to an improved valve arrangement for selectively distributing fluids from a plurality of supply vessels to a receiving vessel. This invention represents an improvement upon the valve arrangement disclosed in our U.S. Pat. No. 4,008,736; the disclosure of which is hereby incorporated by reference, as if fully set forth herein. Such valve arrangements are utilized in connection with the distribution of chemicals into process vessels for their reaction. It is imperative that the supply lines and conduit lines leading to the vessel remain free from residue and that the valves critically meter the amount of chemicals supplied. The instant invention provides for a valve arrangement that is both mechanically simple and provides for shorter switching times than those of other such arrangements.

SUMMARY OF THE INVENTION

Generally speaking, in accordance with the invention, an improved valve arrangement adapted to selectively distribute fluids from supply vessels to a receiving vessel is provided. A common conduit line runs through a block and has an output end connectable to a receiving vessel. The line has a series of openings along one surface of the block. Flexible membranes disposed above the openings of the common conduit line and similar openings in the block surface from supply conduit lines control the fluid communication between the supply conduits and the common conduit lines.

Accordingly, it is an object of this invention to provide an improved valve arrangement for the distribution of fluid substances to a processing vessel having a simplified mechanical design.

Another object of the invention is to provide an improved valve arrangement for the distribution of fluids having a short switching time.

Still another object of this invention is to provide an improved valve arrangement in which the supply lines and common conduit remain residue free.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
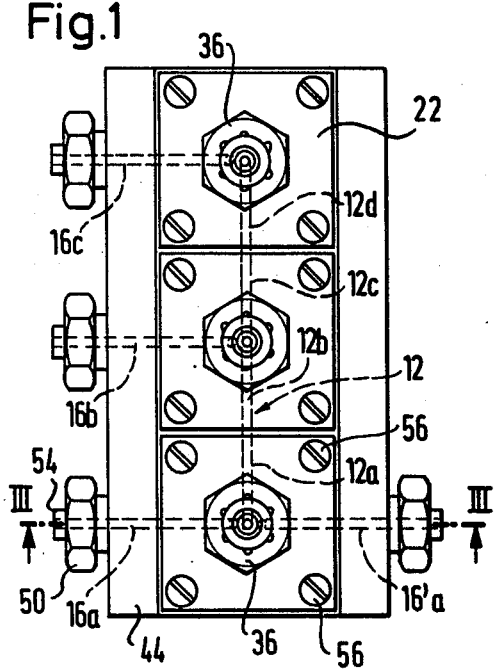
FIG. 1 is a top plan view of the device constructed in accordance with the instant invention.
Figure 2:
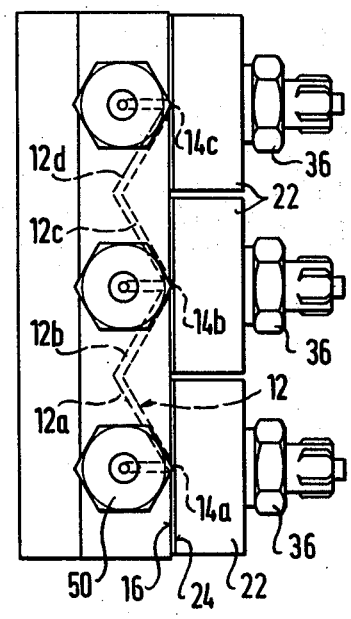
FIG. 2 is a side elevational view of the device.

The drawings illustrate an improved valve arrangement for distributing fluids which includes a conduit block 10 which may be constructed from any suitable material such as plastic. Leading through conduit block 10 is a common conduit line 12 which consists of bores 12a, 12b, 12c and 12d which form the overall zig-zag appearance of conduit line 12. The apex apertures 14a, 14b and 14c are located in the upper boundary surface 16 of conduit block 12. Conduit line 12 may communicate with a series of connecting lines 16a, 16'a, 16b and 16c at apex apertures 14a, 14b and 14c as will hereinafter be further described.

Figure 3:
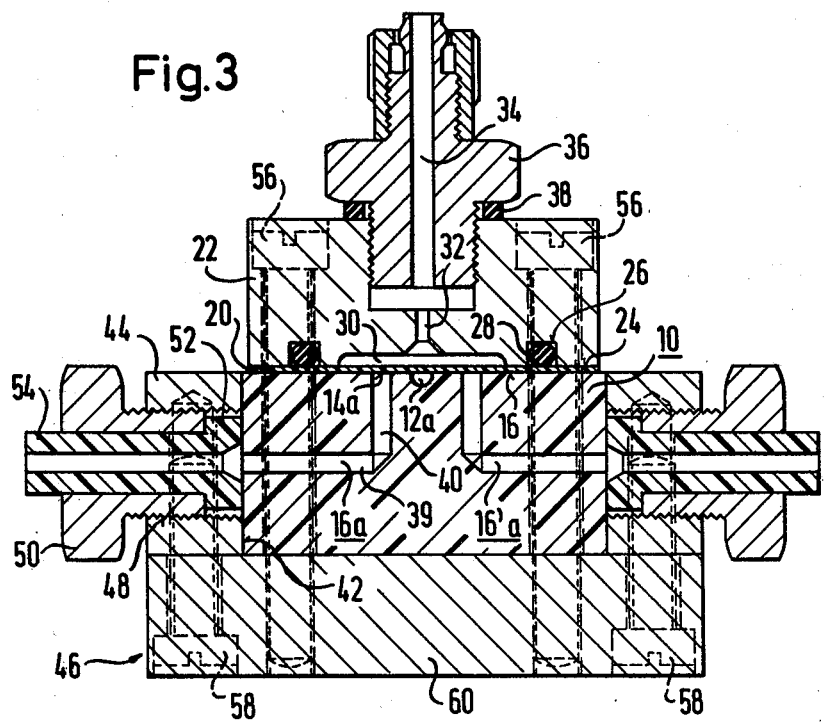
FIG. 3 is a sectional view taken along line III—III of FIG. 1.

FIG. 3 is a sectional view of the device at a point corresponding to apex aperture 14a, which shows connecting line 16a and connecting line 16'a. The ends of these lines are located in boundary surface 16 and are covered by a flexible membrane 20 which is pressed against boundary surface 16 by means of a connecting block 22. Each connecting block 22 is attached to conduit block 10 by means of four screws 56 located at each corner of each connecting block 22. The lower contacting surface 24 of connecting block 22 includes an annular channel 26 to receive an annular seal 28 which contacts and seals membrane 20 against boundary surface 16 of conduit block 10. Located within the periphery of annular channel 26 is a chamber 30 including a bore 32 for applying actuating pressure upon membrane 20 to seal or open the ends of lines 12, 16a and 16'a. A pressure line 34 which passes through a nipple 36 is connected to chamber 30 through bore 32 to supply fluid under pressure for controlling the operation of membrane 30. Nipple 36 is sealed to connecting block 22 by means of an annular seal 38.

Fluid pressure supplied through line 34 controls the opening and closing of lines 12a, 16a and 16'a. When there is no fluid pressure on membrane 20, line 12a of conduit line 12 may communicate with connecting lines 16a and 16'a. When fluid pressure is supplied from a remote source to chamber 30 through line 34, membrane 20 will be pressed tightly against boundary surface 16 so that line 12a of common conduit line 12 is sealed from communicating with connecting lines 16a and 16'a.

Connecting line 16a is composed of two bores 39 and 40 which are orientated perpendicularly with respect to each other. The other connecting lines, 16'a, 16b and 16c are also composed of a pair of perpendicularly orientated bores and are in all respects structurally identical to that of lines 16a and its fittings. Bore 39, of connecting line 16a, opens into side surface 42 of conduit block 10. Surface 42 contacts a leg 44 of a U-shaped housing 46, which cradles conduit block 10. U-shaped housing 46 includes a cross piece 60 and a pair of legs 44. Each leg 44 of housing 46 is attached to cross piece 60 by means of screws 58 and cross piece 60 lies against the bottom surface of conduit block 10. Leg 44 of housing 46 contains a bore 48 which receives a threaded sleeve 50 which presses a flange 52 of a nipple 54 of connecting line 16a against surface 42 of conduit block 10.

In the embodiment shown, two connecting lines 16a and 16'a are placed in communication with apex aperture 14a by operation of membrane 20, whereas only one connecting line each 16b and 16c is connected to apex apertures 14b and 14c, respectively. It is to be noted that it is possible to connect either one, two or more connecting lines to each apex aperture 14a, 14b and 14c.

In operation, connecting line 16c may be used to establish the connection to the process vessel and connecting lines 16a and 16b are used to supply the individual reaction substances and connecting line 16'a is used for supplying a medium, such as nitrogen, for the flushing of the lines. Of course, any other arrangement is possible by suitable interconnection between the lines. The fluidic controlled membranes 20 represent a simple and relatively fast mode of operation and switching of the connecting lines, in a valving arrangement which minimizes any open areas in the connecting lines so that these lines may be thoroughly cleaned before usage to insure that the processing vessel is not contaminated from its previous use.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A valve arrangement adapted to selectively distribute fluids from one or more supply vessels to a receiving vessel comprising a block having at least one substantially flat surface, at least two supply conduits in said block, at least one output conduit in said block, a common elongated conduit formed in said block, said common elongated conduit having an output end connectable to said output conduit, said common elongated conduit being comprised of sections disposed in zig-zag fashion throughout said block, said common elongated conduit further including at least two openings along the length thereof, said openings being defined by the intersection at said surface of said block of adjacent zig-zag sections of said common elongated conduit, said supply conduits each having an opening in said flat surface of said block, each said opening of said supply conduits being proximate one of said openings of said common conduit at the surface of said block, flexible membranes disposed on said flat surface and each membrane overlying the openings therein of said supply conduit and the proximate opening of said one common conduit for closing thereof, means connected to said block for sealing said membranes to the surface thereof, said membranes having a first side in contact with the surface of said block and an opposite second side, means in operative association with said membranes for applying forces thereto to seal said first sides of said membranes against said surface of said block to thereby seal said openings to prevent fluidic communication therebetween, and said means for sealing said membranes to said block including portions spaced from said second sides of said membranes to permit deflection of said membranes thereby to provide a space between the first sides of said membranes and the surface of said block for the passage of fluid from said supply conduits to said common conduit, said common conduit providing a continuous open flow line regardless of the positions of said membranes.

2. A valve arrangement as claimed in claim 1, wherein said means for applying a force to said membrane comprise fluid pressure means.

3. A valve arrangement as claimed in claim 2, wherein said spaced portion of said sealing means comprises a chamber mounted above each said membrane and a fluid supply line connected to said chamber for supplying said pressure to displace said membrane.

4. A valve arrangement as claimed in claim 1, wherein said sealing means includes a sealing ring to seal said membrane to said flat surface.

5. A valve arrangement as claimed in claim 1, wherein said block is rectangular and said common conduit extends parallel to sides of said blocks and said block includes lateral surfaces which adjoin said flat surface and which are parallel to said common elongated conduit, said supply conduit being formed by intersecting bores which are perpendicular to said flat surface and said lateral surfaces of said block.

6. A valve arrangement as claimed in claim 5, wherein said block is disposed in a U-shaped housing, said U-shaped housing having a transverse leg lying against the block surface opposite said flat surface, said U-shaped housing having outer legs lying against said lateral surfaces, said outer legs having threaded bores and sleeves threaded to said threaded bores for connection to said supply conduits.

7. A valve arrangement as claimed in claim 1, further including a third supply conduit in said block said third supply conduit having an opening in said flat surface proximate to an opening of said common conduit, said third opening being disposed beneath the associated membrane, to permit fluid flow from said second supply conduit to said common conduit when said associated membrane is deflected.

* * * * *